(12) United States Patent
Sarna

(10) Patent No.: US 10,679,184 B2
(45) Date of Patent: Jun. 9, 2020

(54) AUTOMATED CONTEXT-BASED COLLABORATIVE WORKSPACE DYNAMIC CREATION

(71) Applicant: CA, Inc., New York, NY (US)

(72) Inventor: Rahul Sarna, Raleigh, NC (US)

(73) Assignee: CA, Inc., New York (*) Notice: Subject to any disclaimer, the term of this patent is extended or adjusted under 35 U.S.C. 154(b) by 117 days.

(21) Appl. No.: 15/697,551

(22) Filed: Sep. 7, 2017

(65) Prior Publication Data

US 2019/0073633 A1 Mar. 7, 2019

(51) Int. Cl.
*G06Q 10/10* (2012.01)

(52) U.S. Cl.
CPC ......... *G06Q 10/101* (2013.01); *G06Q 10/103* (2013.01)

(58) Field of Classification Search
CPC .................................................. G06Q 10/101
USPC ....................................................... 709/204
See application file for complete search history.

(56) References Cited

U.S. PATENT DOCUMENTS

| 9,866,564 B2 | 1/2018 | Bolnick et al. |
| 2008/0133501 A1* | 6/2008 | Andersen ............ G06F 16/9535 |
| 2011/0239135 A1* | 9/2011 | Spataro .................. G06F 16/93 |
| | | 715/753 |

* cited by examiner

*Primary Examiner* — David R Lazaro
*Assistant Examiner* — Zia Khurshid
(74) *Attorney, Agent, or Firm* — Shook, Hardy & Bacon L.L.P.

(57) ABSTRACT

Provided is a computer system that includes a processor and a memory coupled to the processor, the memory including computer readable program code embodied therein that, when executed by the processor, causes the processor to receive, from each of multiple collaboration data sources, a data thread that corresponds to a given context, generate, from at least one of the collaboration data sources, a dynamic data thread that includes data thread content from each of the collaboration data sources, and generate a collaborative workspace based on the given context using the dynamic data thread to provide a development environment that includes the multiple collaboration data sources in a single data thread.

18 Claims, 5 Drawing Sheets

AUTOMATED CONTEXT-BASED COLLABORATIVE WORKSPACE DYNAMIC CREATION

BACKGROUND

Significant increases in the use of sophisticated systems have enabled world-wide collaboration using home PCs and, more recently, through ubiquitous hand-held devices. The purposes are as numerous as they are varied, and may include content sharing, whether through blogs or many well-known peer-to-peer (P2P) applications. For example, collaborative computation, starting from the early SETI@home project (setiathome.berkeley.edu) was one of the early large-scale grid computing instances.

Additionally, the team concept has been successfully used in development industries, such as, for example, software development. Developers may be organized in teams that may collaboratively work together using different sets of development tools. However, some tools may be directed to specific aspects of development and may not provide interaction in a collaborative manner within a team and/or organization.

Some tools may provide team collaboration by interacting with different teams in an organization and support communications, such as chat conversations. Other tools may support other aspects of team collaboration, such as file sharing. Such tools may integrate with other tools that provide data streams (e.g., threads) that may be directed to different aspects of collaboration. However, such threads, even if related by project, may have to be accessed independently relative to one another, which may provide barriers to collaboration. For example, brief reference is now made to FIG. 1, which is a block diagram illustrating a schematic view of a workspace receiving data threads from different data sources according to conventional methods. As illustrated, a conventional workspace 24 may receive data via multiple different data threads 21-1 to 21-N from multiple data sources 20-1 to 20-N. Within the workspace 24, the data corresponding to the different data threads 21-1 to 21-N having the same context (Context 1) may be accessed and used via separate non-integrated thread spaces 1 (22-1) to N (22-N).

As such, it may be advantageous to provide an enhanced workspace that accommodates multiple different threads from different providers.

BRIEF SUMMARY

Embodiments herein include methods, computer program products and systems that may be configured and/or operable to perform operations described herein. Some embodiments are directed to computer implemented methods. Such methods include receiving, from each of multiple collaboration data sources, a data thread that corresponds to a given context, generating, from at least one of the collaboration data sources, a dynamic data thread that includes data thread content from each of the collaboration data sources. The dynamic data thread includes data streams that include the given context. Methods include presenting the dynamic data thread as a single data thread that includes data items corresponding to the collaboration data sources and generating a collaborative workspace based on the given context using the dynamic data thread to provide a development environment that includes the collaboration data sources.

In some embodiments, the collaboration data sources include multiple different types of collaboration data sources. Some embodiments provide that a first type of collaboration data source of the types of collaboration data sources includes a file repository that is configured to be shared by a group of users and a second type of collaborative data source of the types of collaboration data sources includes a communication service that is configured to receive communication messages from ones of the group of users and to post the received communication messages to other ones of the group of users. In some embodiments, a third type of collaborative data source of the types of collaboration data sources includes a collaborative software development environment.

In some embodiments, a first one of the collaboration data sources includes one of the first, second or the third type of collaborative data sources and a second one of the collaboration data sources includes one of the first, second or the third type of collaborative data sources that is different from the first one of the collaboration data sources.

Some embodiments provide that generating the dynamic data thread that includes data thread content from each of the collaboration data sources includes generating the dynamic data thread that includes a context corresponding to one of the collaboration data sources. Methods may further include, responsive to receiving the data thread corresponding to another one of the collaboration data sources, identifying the another one of the collaboration data sources as including the given context, and updating the dynamic data thread to include the another one of the collaboration data sources.

In some embodiments, generating the dynamic data thread that includes data thread content from each of the collaboration data sources includes identifying multiple ones of the collaboration data sources as including the given context, and responsive to identifying the multiple ones of the collaboration data sources as including the context, generating the dynamic data thread.

Some embodiments provide that generating the dynamic data thread includes determining contexts corresponding to the data thread of each of the collaboration data sources to determine if the contexts are the given context.

In some embodiments, the data thread content from each of the collaboration data sources that is in the dynamic data thread is directly accessible the group of users without directly accessing a collaboration data source of the collaboration data sources.

In some embodiments, generating the dynamic data thread includes generating a unique key identifier that corresponds to the given context, determining if ones of the collaboration data sources include the unique key identifier, and responsive to determining that one of the collaboration data sources includes the unique key identifier, including that one of the collaboration data sources in the dynamic data thread. Some embodiments provide that the unique key identifier includes a descriptive text string that corresponds to the context and that determining if ones of the collaboration data sources include the unique identifier includes determining a degree of matching between the descriptive text string of the dynamic data thread and ones of the collaboration data sources.

Some embodiments provide that the collaborative workspace includes access to the collaboration data sources via the dynamic data thread to the group of users.

In some embodiments, the collaborative workspace includes a persistent repository of the data thread content of the dynamic data thread that includes the collaboration data sources that include multiple different types of collaboration data sources.

Some embodiments provide generating a data thread hierarchy that includes the dynamic data thread at a first level and ones of the collaboration data sources at a second level.

Some embodiments of the inventive concept are directed to computer program products. Such program products include a computer readable storage medium having computer readable program code embodied in the medium. The computer code includes computer readable code to receive, from each of multiple collaboration data sources, a data thread that corresponds to a given context, computer readable code to generate, from at least one of the collaboration data sources, a dynamic data thread that includes data thread content from each of the collaboration data sources, computer readable code to represent the dynamic data thread as a single data thread that includes data items corresponding to the collaboration data sources, and computer readable code to generate a collaborative workspace based on the given context using the dynamic data thread to provide a development environment that includes the collaboration data sources in a single data thread.

In some embodiments, the collaboration data sources include multiple different types of collaboration data sources and the collaborative workspace includes access to the collaboration data sources via the dynamic data thread to the group of users.

Some embodiments provide that the collaborative workspace includes a persistent repository of the data thread content of the dynamic data thread that includes the collaboration data sources that include multiple different types of collaboration data sources.

In some embodiments, the computer readable code to generate the dynamic data thread includes computer readable code to generate a unique key identifier that corresponds to the given context, computer readable code to determine if ones of the collaboration data sources include the unique key identifier, computer readable code that includes ones of the collaboration data sources in the dynamic data thread that are determined to include the unique key identifier. In some embodiments, the unique key identifier includes a descriptive text string that corresponds to the context.

Some embodiments of the present inventive concept are directed to computer systems that include a processor and a memory coupled to the processor. The memory includes computer readable program code embodied therein that, when executed by the processor, causes the processor to receive, from each of multiple collaboration data sources, a data thread that corresponds to a given context, generate, from at least one of the collaboration data sources, a dynamic data thread that includes data thread content from each of the collaboration data sources, and generate a collaborative workspace based on the given context using the dynamic data thread to provide a development environment that includes the collaboration data sources in a single data thread.

In some embodiments, the dynamic data thread is a single data thread that includes data items corresponding to the collaboration data sources, the collaboration data sources include multiple different types of collaboration data sources, and the collaborative workspace includes access to the collaboration data sources via the dynamic data thread to the group of users.

Some embodiments provide that a first type of collaboration data source of the types of collaboration data sources includes a file repository that is configured to be shared by a group of users, a second type of collaborative data source of the types of collaboration data sources includes a communication service that is configured to receive communication messages from ones of the group of users and to post the received communication messages to other ones of the group of users, and a third type of collaborative data source of the types of collaboration data sources includes a collaborative software development environment. In some embodiments, a first one of the collaboration data sources includes one of the first, second or the third type of collaborative data sources and a second one of the collaboration data sources includes one of the first, second or the third type of collaborative data sources that is different from the first one of the collaboration data sources.

It is noted that aspects of the disclosure described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
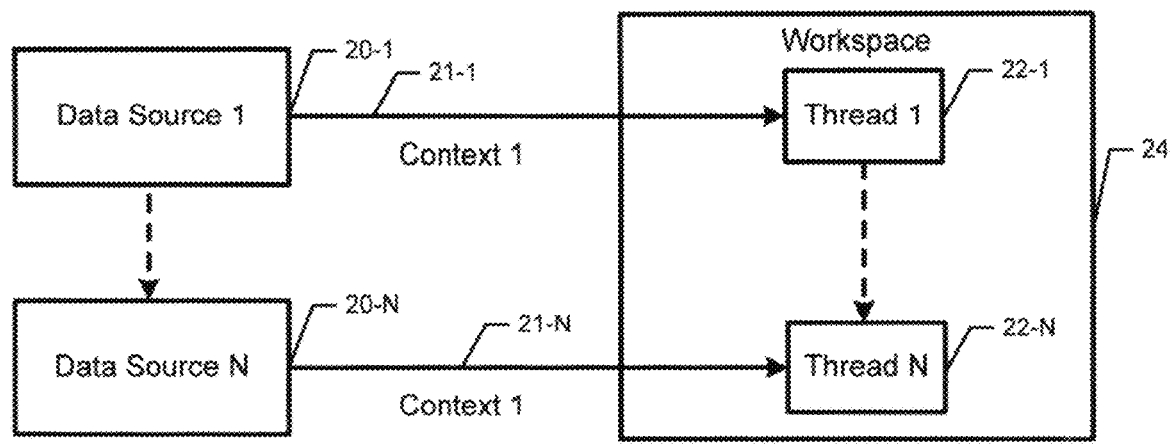
FIG. 1 is a block diagram illustrating a schematic view of a workspace receiving data threads from different data sources according to conventional methods.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Various embodiments described herein may arise from a recognition that new real-time data corresponding to the same project and/or function may be provided from multiple data sources, such as collaborative development environments. Various embodiments described herein can overcome potential difficulties that may arise due to receiving data from multiple data sources by generating a dynamic data thread that includes data content from different data sources and types of data sources. Additionally, the dynamic data thread may be implemented in a dynamic context-based workspace that may be generated and may include the dynamic data thread.

Figure 2:
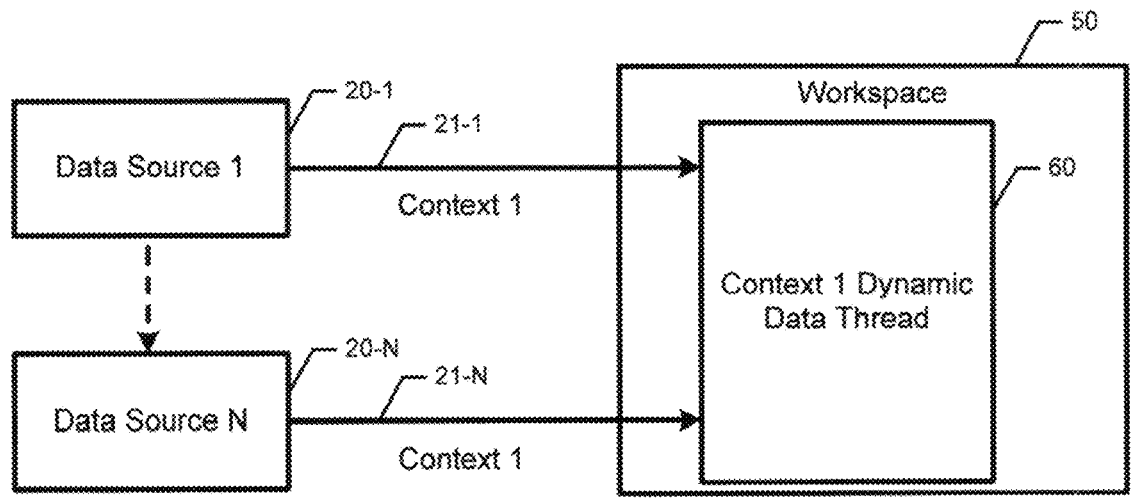
FIG. 2 is a block diagram illustrating a schematic view of a workspace receiving data threads from different data sources according to according to various embodiments described herein.

Reference is now made to FIG. 2, which is a block diagram illustrating a schematic view of a workspace receiving data threads from different data sources according to according to various embodiments described herein. Similar to FIG. 1 as described above, a workspace 50 may receive data via multiple different data threads 21-1 to 21-N from multiple data sources 20-1 to 20-N. In contrast with the conventional approach of FIG. 1, however, the data corresponding to the different data threads 21-1 to 21-N having the same context (Context 1) may be accessed and used via a single dynamic data thread 60 that includes content from the different data sources 20-1 to 20-N and types thereof that correspond to the same context (Context 1).

Figure 3:
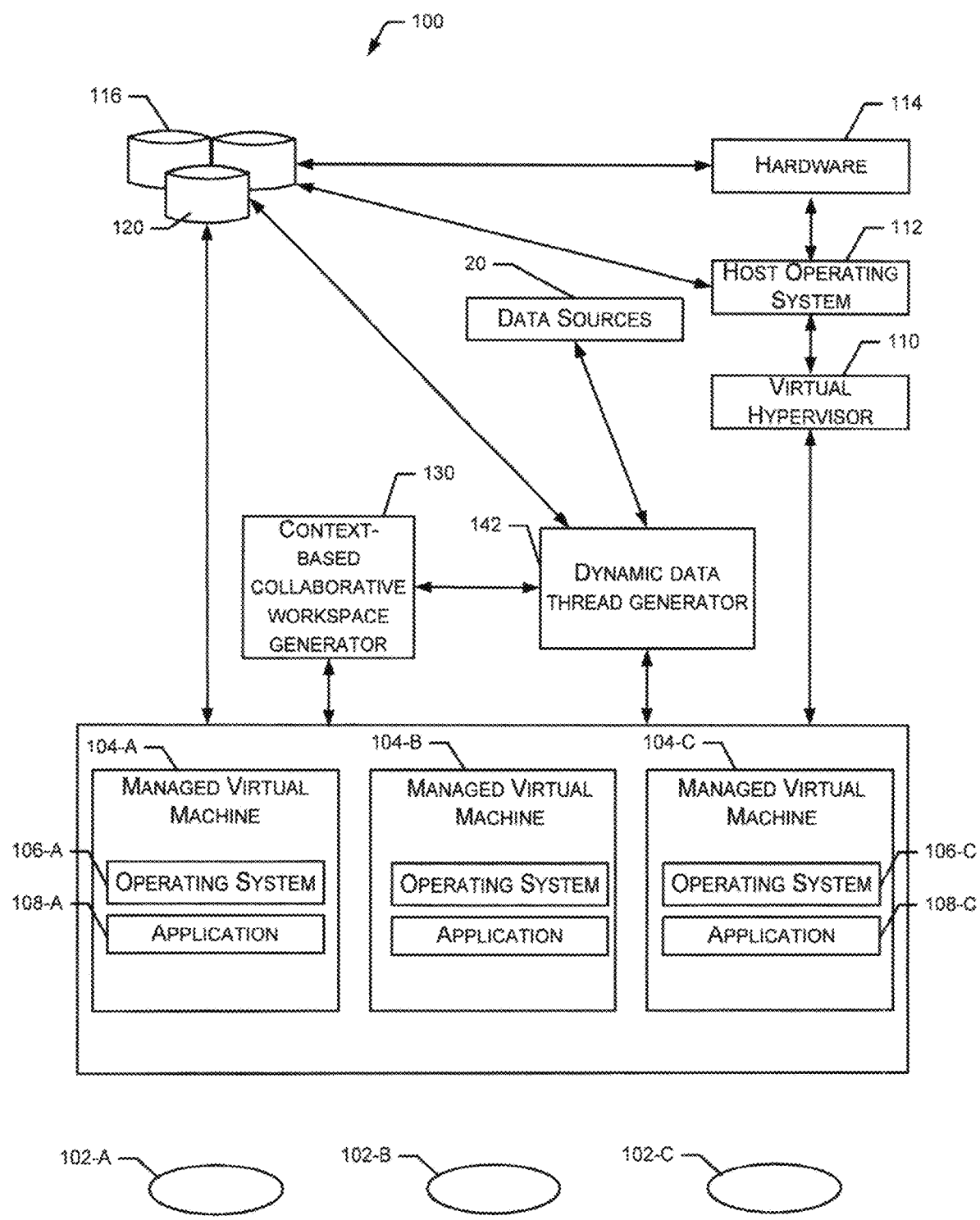
FIG. 3 is a block diagram of a computing system that supports a virtual operating environment according to some embodiments of the present inventive subject matter.

Reference is now made to FIG. 3, which is a block diagram of a computing system that supports a virtual operating environment according to some embodiments of the present inventive subject matter. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the virtual machines 104. A virtual hypervisor 110 can provide an interface between the virtual machines 104 and a host operating system 112 and allow multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computer system capable of implementing virtual machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit (s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial and/or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) may run on the host operating system 112 and may provide an interface between the virtual machine 104 and the hardware platform 114 through the host operating system 112. The virtual hypervisor 110 virtualizes the computer system resources and facilitates the operation of the virtual machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the virtual machines 104 present a virtualized environment to the guest operating systems 106, which in turn provide an operating environment for applications 108 and other software constructs.

Applications 108 that are implemented on the virtual machines 104 may be configured to access one or more data sources in accordance with the functions thereof. As discussed herein by way of example, a data source may be a file, however, the disclosure is not so limited. For example, database applications and/or applications that operate, at least in part, using data sources such as database files, may rely on access to one or more database files to perform the requisite operations. In some embodiments, such access may further include one or more settings that determine or identify a portion, format, location, path, version or other attribute of the file being accessed. For example, an access request corresponding to a database file may include query terms, among others. In some embodiments, an access request corresponding to a database file may be directed to a database 120 that may be included in or provided in addition to the data storage space 116.

In some embodiments, a dynamic data thread generator 142 may be configured to generate a dynamic data thread based on data threads from multiple different collaboration data sources 20. The dynamic thread generator 142 is configured to receive data corresponding to different collaboration data sources 20 and to identify which of these collaboration data sources 20 includes a given context. The context may be defined as a unique key identifier corresponds to a particular project, function and/or task that a group of users is working to accomplish. Some embodiments provide that the context may be descriptive of the project, function and/or task and that the dynamic data thread generator 142 may be configured to parse and/or identify keywords in the descriptive context to determine if a given collaboration data source 20 is directed to the given context.

In some embodiments, the dynamic data thread generator 142 may initiate a dynamic data thread using the context of a single received data thread corresponding to a particular collaboration data source 20. Initiation of the dynamic data thread may be responsive to a received input from one or more of the users. For example, a user may determine that data and/or data types corresponding to multiple different collaboration data sources 20 will be beneficial to completing the project, function and/or task. The user may provide an input that causes the dynamic data thread generator 142 initiate the dynamic data thread based on the single collaboration data source 20 with the understanding that additional collaboration data sources 20 may be later included in the dynamic data thread.

In some embodiments, a content-based collaborative workspace generator 130 may be configured to generate a collaborative workspace based on a given context using the dynamic data thread to provide a development environment that integrates and includes multiple different collaboration data sources 20.

Although illustrated as a stand-alone functional block, the content-based collaborative workspace generator 130 and/or the dynamic data thread generator 142 may be a module, function, feature and/or service included in and/or integrated with a service that provides a collaborative development workspace and/or support.

Figure 4:
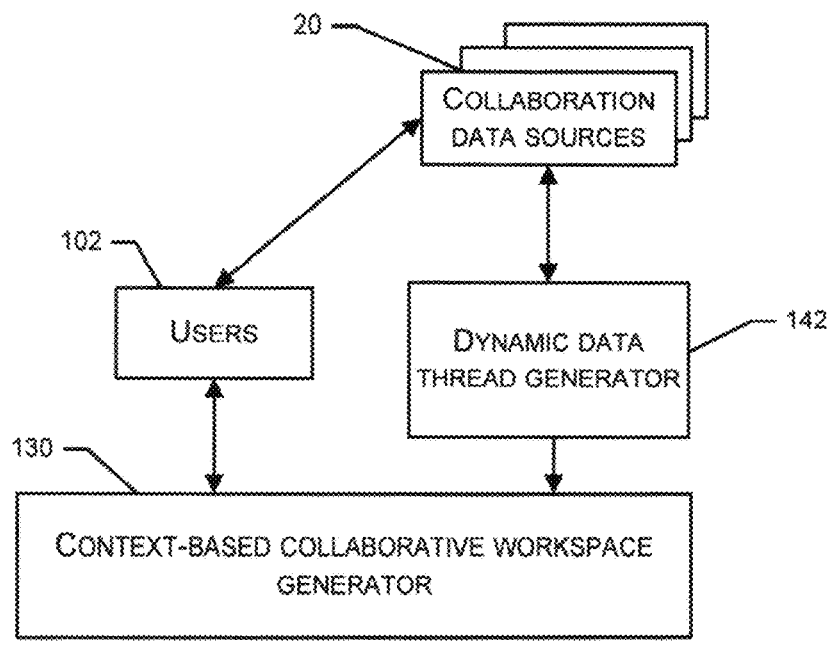
FIG. 4 is a block diagram illustrating devices/modules that may be used according to some embodiments of the present inventive subject matter.

Reference is now made to FIG. 4, which is a block diagram illustrating devices/modules that may be used according to some embodiments of the present inventive subject matter. A content-based collaborative workspace generator 130 may be configured to generate a collaborative workspace based on a given context using the dynamic data thread to provide a development environment that integrates and includes multiple different collaboration data sources 20.

Examples of collaboration data sources 20 include communication services such as applications for collaborative chat functions, file repositories that may be shared by the group of users and/or development environments including for example collaborative software development environments, among others. As illustrated, users 102 may directly access different ones of the collaboration data sources 20 and/or may access content corresponding to the different collaboration data sources 20 via a dynamic data thread in a context-based collaborative workspace provided by the context-based collaborative workspace generator 130. As provided above, a dynamic data thread generator 142 may generate dynamic data thread that includes content corresponding to multiple different ones of the collaboration data sources 20. While illustrated as separate functional blocks, the functions and structures of the dynamic data thread generator 142 and the context-based collaborative workspace generator 130 be combined into a single functional module.

Some embodiments provide that the context-based collaborative workspace generator 130 may receive inputs from users 102 corresponding to the selection of collaboration data sources 20 to be included in the context-based collaborative workspace and/or dynamic data thread. For example, the context-based collaborative workspace generator 130 may receive inputs from the users 102 and generate one or more suggested context-based collaborative workspaces.

Figure 5:
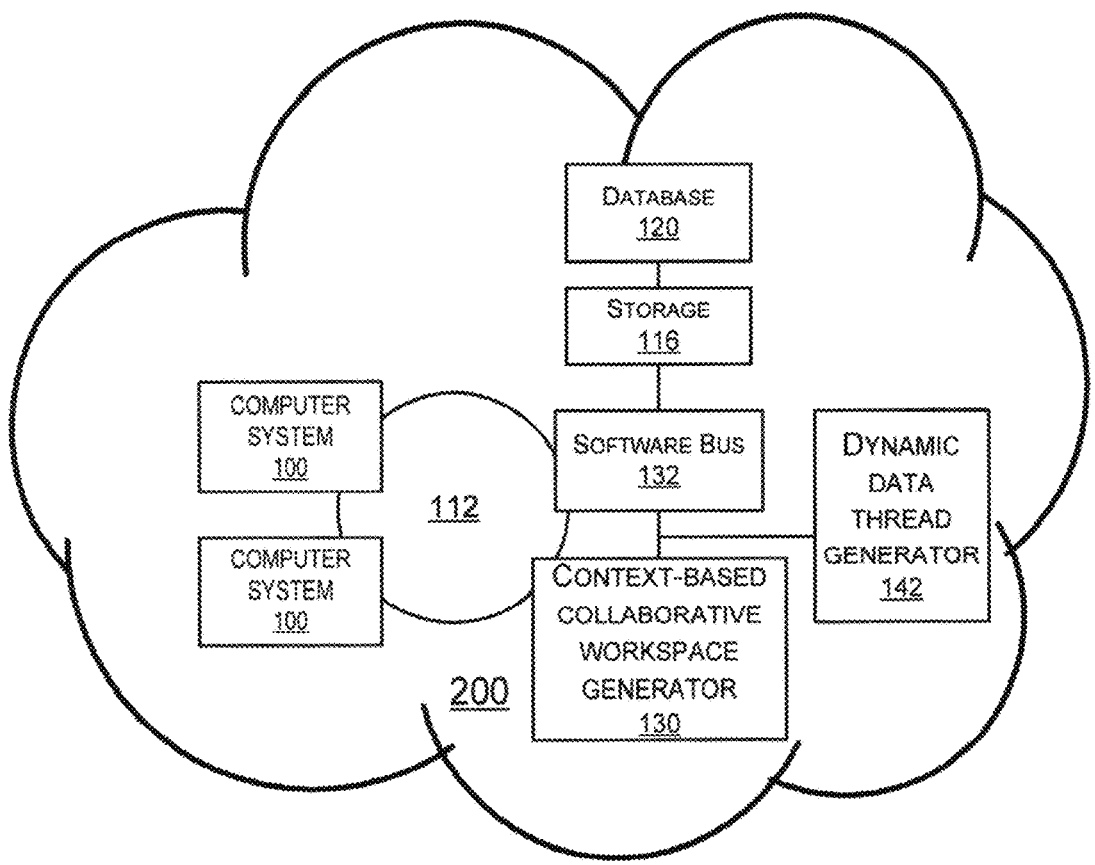
FIG. 5 is a block diagram that illustrates a virtual computing environment according to some embodiments of the present inventive subject matter.

Reference is now made to FIG. 5 which illustrates a virtual computing environment according to some embodiments of the present inventive subject matter. A virtual computing environment 200 (referred to generally as cloud 200) may include one or more computer systems 100 (referred to as server systems) that may include one or more electronic computing devices operable to receive, transmit, process, and store data. For example, the servers in the cloud 200 may include one or more general-purpose personal computers, workstations, server computers, server pools, or any other suitable devices. In certain embodiments, the cloud 200 may include a web server. In short, the cloud 200 may include any suitable combination of software, firmware, and hardware.

The plurality of server systems 100 may be communicatively coupled via a network 112. The network 112 facilitates wireless and/or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. Although referred to herein as "server systems", it will be appreciated that any suitable computing device may be used. A network address may include an alphabetic and/or numerical label assigned to a device in a network. For example, a network address may include an IP address, an IPX address, a network layer address, a MAC address, an X.25/X.21 address, and/or a mount point in a distributed file system, among others.

While FIG. 5 illustrates a physical configuration of servers within a cloud 200, a computer system 100 may include a logical grouping of virtual machines 104 within a virtualization environment in the cloud 200. Although not illustrated herein, the virtual machines 104 in the cloud can be organized and managed in clusters, which may also be referred to herein as "grids". A virtualization environment in the cloud 200 may be managed by a single hypervisor 110, or a set of hypervisors 110.

Virtual machines can be deployed in particular virtualization environments and organized to increase the efficiency of operating and/or managing a virtual computing environment. For example, virtual machines may be grouped into clusters in order to provide load balancing across multiple servers.

A context-based collaborative workspace generator 130 as discussed above regarding FIG. 4 may generate a collaborative workspace that is based on a given context using the dynamic data thread to provide a development environment that integrates and includes multiple different collaboration data sources 20. A dynamic data thread generator 142 as discussed above regarding FIG. 4 may generate dynamic data thread that includes content corresponding to multiple different ones of the collaboration data sources 20. The context-based collaborative workspace generator 130 and/or the dynamic data thread generator 142 may be included in and/or provided by one or more of the virtual machines 104 in the cloud 200.

Figure 6:
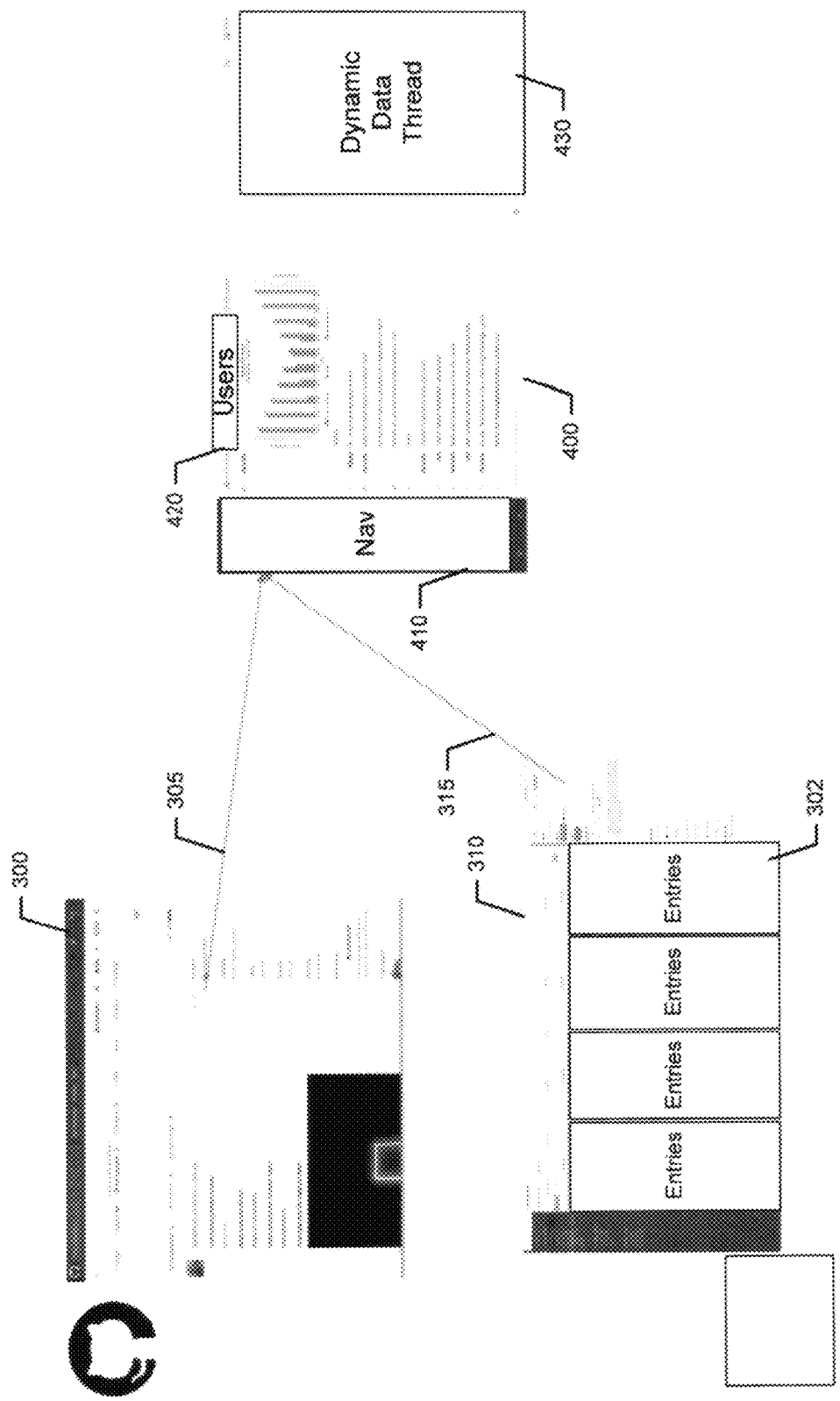
FIG. 6 is a block diagram illustrating example screen shots of multiple data sources and a dynamic collaborative workspace according to some embodiments of the present inventive subject matter.

Brief reference is now made to FIG. 6, which is a block diagram illustrating example screen shots of multiple data sources and a dynamic collaborative workspace according to some embodiments of the present inventive subject matter. As illustrated, a first collaborative data source may include a first user interface 300 that provides data corresponding to the first collaborative data source. For example, the first collaborative data source may correspond to a group communication application that may provide a user chat environment in which a group of users can post content and read content posted by other users in the group. Content can include messages and/or attachments that, once posted, can be accessed by other ones of the group of users. The first collaborative data source may include multiple different threads that are directed to different topics and/or sub-topics.

A second collaborative data source may include a second user interface 310 that provides data corresponding to the second collaborative data source. For example, the second collaborative data source may correspond to a group development environment that provides a group of users an interactive interface in which to develop software and/or hardware applications, systems, programs, and/or designs. Content posted can include communications among members, attachments, data, software programs and/or portions thereof, executable code and/or links to other content, such as other resources. The second user interface 310 may include different categories of entries or postings 302. In some embodiments, such categories may correspond to different completion levels and/or status corresponding to development tasks, such as initialized, in work, testing, and completed, among others.

The first and second collaborative data sources may provide respective data threads 305, 315 that may be received by the dynamic collaborative workspace 400. The dynamic workspace 400 may include a navigation interface 410 that allows users to select from multiple different dynamic data threads. A dynamic data thread interface 430 may include contents corresponding to a selected dynamic data thread. The contents corresponding to the selected data thread may include context-specific data content of the data threads 305, 315 from the first and second collaboration data sources. In this manner, a workspace may be provided that combines two streams of data from two different data sources that may be different types of data sources and that have the same context into a single dynamic data thread that provides a collaborative work space based on that context.

The dynamic workspace 400 may further include other interface portions including a users interface 420 that identifies users in the group of users associated with the specific context and/or user status information, such as availability, among others.

Figure 7:
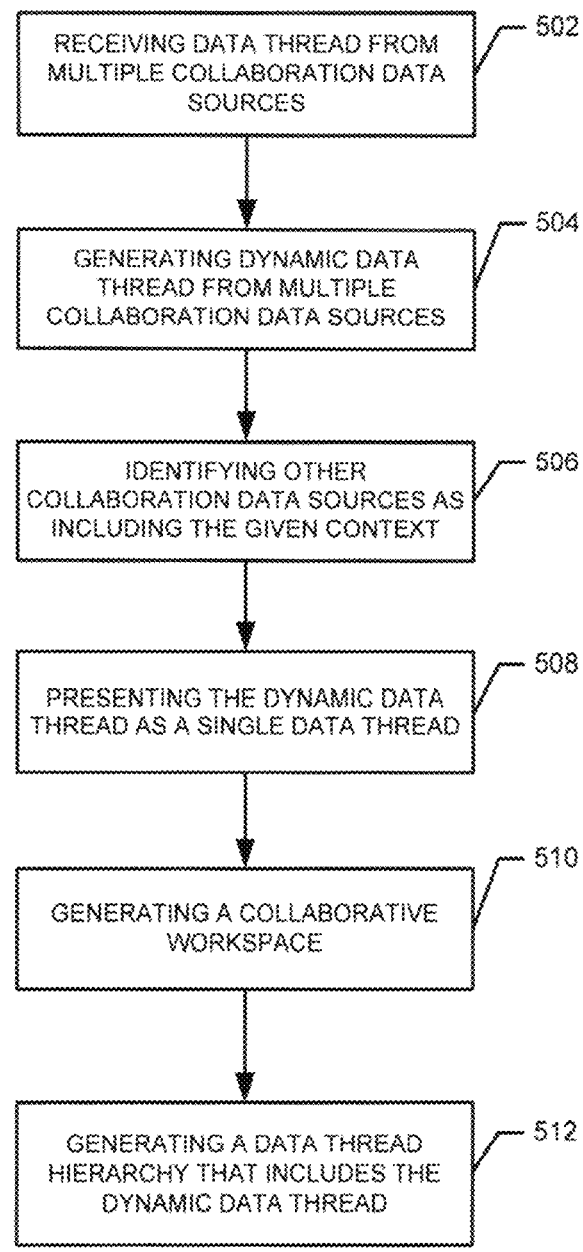
FIG. 7 is a flowchart illustrating operations for systems/methods according to some embodiments of the present inventive subject matter.

Reference is now made to FIG. 7, which is a flowchart illustrating operations for systems/methods according to some embodiments of the present inventive subject matter. Some embodiments include receiving a data thread from multiple collaboration data sources (block 502). The collaboration data sources may include different types of collaboration data sources. For example, types of collaboration data sources may include a file repository that is configured to be shared by a group of users, a communication service that is configured to receive communication messages from ones of the group of users and to post the received communication messages to other ones of the group of users, and a collaborative software development environment. Data threads from the different collaboration data sources and/or types thereof may include specific contexts that may be determined by title, descriptions, story lines, etc.

Some of the data threads from the different collaboration data sources may include the same context as one another. In such cases, a dynamic data thread that includes data thread content from each of the collaboration data sources and that includes the same context may be generated (block 504). Some embodiments provide that generating the dynamic data thread includes generating the dynamic data thread that includes a context corresponding to one of the collaboration data sources. For example, the dynamic data thread may be generated based on a single instance of a data thread from a collaboration data source with the expectation that other data threads from other collaboration sources may be included subsequently. In response to receiving a data thread corresponding to another collaboration data sources, that collaboration data source may be identified as including the given context (block 506). Once identified as including the context, some embodiments provide that the dynamic data thread may be updated to include that collaboration data source.

In some embodiments, multiple different collaboration data sources may be identified and the dynamic data thread generated based on the multiple identified collaboration data sources. For example, the context corresponding to each data thread may be analyzed to determine the contexts are the given context. Some embodiments provide that the data threads are analyzed responsive to an input from a user. For example, a user may determine that a data thread should be included in a dynamic data thread. In such circumstance, the system may receive data corresponding to the collaborative data source via a source input template. In some embodiments, the source input template may be generated to include input fields that are specific to the context and/or to the type of collaboration data source.

Once included in the dynamic data thread, the content from each of the collaboration data sources is provided in an integrated manner. As such, content from each of the collaboration data sources that is in the dynamic data thread is directly accessible the group of users without directly accessing any of the collaboration data sources.

Some embodiments provide that generating the dynamic data thread includes generating a unique key identifier that corresponds to the given context. In evaluating whether a collaboration data source should be included in the dynamic data thread, operations may include determining if ones of the collaboration data sources include the unique key identifier. In response to determining that a collaboration data source includes the unique key identifier, that collaboration data source may be included in the dynamic data thread. Some embodiments provide that the unique key identifier includes a descriptive text string that corresponds to the context. Determining whether a collaboration data source includes the unique identifier may be performed by determining a degree of matching between the descriptive text string of the dynamic data thread and the collaboration data source.

In some embodiments, the dynamic data thread that includes data items and/or content from multiple collaboration data sources may be presented to a user as a single data thread that includes content corresponding to the multiple collaboration sources (block 510). Based on the dynamic data thread, a collaborative workspace based on the given context may be generated to provide a development environment that includes the multiple different collaboration data sources (block 510). The collaborative workspace may provide access to the multiple collaboration data sources via the dynamic data thread for the group of users. In some embodiments, the collaborative workspace includes a persistent repository of the data thread content of the dynamic data thread that includes the multiple collaboration data sources including different types of collaboration data sources.

In some embodiments, a data thread hierarchy that includes the dynamic data thread at a first level and ones of the collaboration data sources at a second level may be generated (block 512). Some embodiments provide that the data thread hierarchy may identify multiple levels such as sub-threads that are a level below collaboration data sources. In some embodiments, the hierarchy may be used to spawn new threads and/or sub-threads into new dynamic data threads.

Systems and methods described herein may provide significant increases in computations efficiency by integrating multiple data threads into a single dynamic data thread and by providing such data thread in a dynamic collaborative workspace.

Server automation/provisioning tools (also referred to as server deployment tools) may be used to manage virtual machines in a cloud computing environment. For example, server automation/provisioning tools may move virtual machines from one hypervisor to another or from one virtualization environment to the other. These tools may also be used, for example, to deploy, provision, activate, suspend, and otherwise manage the operation of virtual machines. These tools may further be used to implement systems/methods according to some embodiments described herein.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer-implemented method, comprising:
   receiving, from a first collaboration data source, a first data thread that corresponds to a particular context;
   generating a dynamic data thread associated with the particular context, wherein the dynamic data thread includes data thread content from the first collaboration data source, wherein the generating the dynamic data thread includes generating an identifier associated with the particular context;
   receiving a second data thread from a second, different collaboration data source;
   determining that the second data thread corresponds to the particular context, wherein the determining is based on a degree of matching between the identifier and the second, different collaboration data source;
   in response to the determining that the second data thread corresponds to the particular context, updating the dynamic data thread to include data thread content from the second, different collaboration data source; and
   generating a collaborative workspace for the particular context that presents the dynamic data thread as a single data thread including data thread content from both the first and the second, different collaborative data sources.

2. The method of claim 1, wherein the dynamic data thread further includes data thread content from a plurality of collaboration data sources, wherein the plurality of collaboration data sources comprise a plurality of different types of collaboration data sources.

3. The method of claim 2,
   wherein a first type of collaboration data source of the plurality of types of collaboration data sources includes a file repository that is configured to be shared by a group of users,
   wherein a second type of collaborative data source, of the plurality of types of collaboration data sources, includes a communication service that is configured to receive communication messages from ones of the group of users and to post the received communication messages to other ones of the group of users, and
   wherein a third type of collaborative data source of the plurality of types of collaboration data sources comprises a collaborative software development environment.

4. The method of claim 3,
   wherein a third one of the plurality of collaboration data sources comprises one of the first, second, or the third types of collaborative data sources, and
   wherein a fourth one of the plurality of collaboration data sources comprises one of the first, second, or the third types of collaborative data sources that is different from the first one of the plurality of collaboration data sources.

5. The method of claim 2, wherein generating the dynamic data thread further includes:
   identifying multiple ones of the plurality of collaboration data sources as being associated with the particular context; and
   responsive to the identifying, generating the dynamic data thread to include data thread content from each of the plurality of collaboration data sources.

6. The method of claim 1, wherein generating the dynamic data thread includes determining contexts associated with each of a plurality of collaboration data sources.

7. The method of claim 1, wherein the data thread content included in the dynamic data thread is directly accessible a group of users without directly accessing the first or the second, different collaboration data sources.

8. The method of claim 1, wherein the identifier includes a descriptive text string that corresponds to the particular context; and
   wherein the determining that the second data thread corresponds to the particular context includes determining the degree of matching between the descriptive text string and the second, different collaboration data source.

9. The method of claim 1, wherein the collaborative workspace provides access to a plurality of collaboration data sources via the dynamic data thread.

10. The method of claim 1, wherein the collaborative workspace includes a persistent repository of the data thread content included in the dynamic data thread.

11. The method of claim 1, further comprising:
    generating a data thread hierarchy that includes the dynamic data thread at a first level and ones of a plurality of collaboration data sources at a second level.

12. A non-transitory, computer-readable medium having instructions stored thereon that are executable by a computer system to perform operations comprising:
    receiving, from a first collaboration data source, a first data thread that corresponds to a particular context;

generating a dynamic data thread associated with the particular context, wherein the dynamic data thread includes data thread content from the first collaboration data source, wherein the generating the dynamic data thread includes generating an identifier associated with the particular context;

receiving a second data thread from a second, different collaboration data source;

determining that the second data thread corresponds to the particular context, wherein the determining is based on a degree of matching between the identifier and the second, different collaboration data source;

in response to the determining that the second data thread corresponds to the particular context, updating the dynamic data thread to include data thread content from the second, different collaborative data source; and generating a collaborative workspace for the particular context that presents the dynamic data thread as a single data thread including data thread content from both the first and the second, different collaborative data sources.

13. The non-transitory, computer readable medium of claim 12, wherein the dynamic data thread further includes data thread content from a plurality of different types of collaboration data sources, and wherein the collaborative workspace provides access to the plurality of different types of collaboration data sources via the dynamic data thread.

14. The non-transitory, computer-readable medium of claim 12, wherein the collaborative workspace includes a persistent repository of the data thread content included in the dynamic data thread.

15. The non-transitory, computer-readable medium of claim 12, wherein the identifier includes a descriptive text string that corresponds to the particular context.

16. A computer system, comprising:

a processor; and a non-transitory, computer-readable medium having instructions stored thereon that, when executed by the processor, cause the computer system to:

receive, from a first collaboration data source, a first data thread that corresponds to a particular context;

generate a dynamic data thread associated with the particular context, wherein the dynamic data thread includes data thread content from the first collaboration data source, wherein generating the dynamic data thread includes generating an identifier associated with the particular context;

receive a second data thread from a second, different collaboration data source;

determine that the second data thread corresponds to the particular context, wherein determining is based on a degree of matching between the identifier and the second, different collaboration data source;

in response to determining that the second data thread corresponds to the particular context, updating the dynamic data thread to include data thread content from the second, different collaboration data source; and generate a collaborative workspace for the particular context that presents the dynamic data thread as a single data thread including data thread content from both the first and the second, different collaborative data sources.

17. The computer system of claim 16, wherein the dynamic data thread includes data items from a plurality different types of collaboration data sources.

18. The computer system of claim 17, wherein a first type of collaboration data source, of the plurality of types of collaboration data sources, includes a file repository that is configured to be shared by a group of users, wherein a second type of collaborative data source, of the plurality of types of collaboration data sources, includes a communication service that is configured to receive communication messages from ones of the group of users and to post the received communication messages to other ones of the group of users, and wherein a third type of collaborative data source, of the plurality of types of collaboration data sources, includes a collaborative software development environment.

* * * * *